(12) United States Patent
Krieger

(10) Patent No.: US 6,276,734 B1
(45) Date of Patent: Aug. 21, 2001

(54) UTILITARIAN COMBINATION UTENSIL

(76) Inventor: Rory F. Krieger, 15 Paramount Pkwy., Lakewood, CO (US) 80215

( * ) Notice: Subject to any disclaimer, the term of this patent is extended or adjusted under 35 U.S.C. 154(b) by 0 days.

(21) Appl. No.: 09/498,498

(22) Filed: Feb. 4, 2000

(51) Int. Cl.[7] ................................................. A47J 43/28
(52) U.S. Cl. ........................ 294/99.2; 294/3; 30/322
(58) Field of Search ..................... 294/99.2, 1.1, 294/3, 8.5, 11, 16, 33; 30/142, 322; D7/643, 683, 686; D28/55; 7/110, 112, 900

(56) References Cited

U.S. PATENT DOCUMENTS

| | | | |
|---|---|---|---|
| D. 212,067 | * 8/1968 | Pearce | D28/55 |
| D. 215,468 | 9/1969 | Callahan | D7/686 |
| D. 297,899 | * 10/1988 | Kato | 30/324 |
| D. 357,846 | 5/1995 | McNaughton | D7/686 |
| D. 374,379 | 10/1996 | Jee et al. | D7/642 |
| 1,889,475 | * 11/1932 | Henkel | 294/99.2 |
| 3,291,476 | * 12/1966 | Calkin | 294/33 |
| 3,889,995 | 6/1975 | Lin | 294/99.2 |
| 4,261,608 | 4/1981 | Bradshaw | 294/99.2 |
| 4,707,922 | 11/1987 | Hosak-Robb | 30/322 |
| 4,715,639 | * 12/1987 | Nicoletta et al. | 294/99.2 |
| 4,728,139 | 3/1988 | Oretti | 294/99.2 |
| 4,750,771 | * 6/1988 | Emmett et al. | 294/99.2 |
| 4,809,435 | 3/1989 | Printz | 30/142 |
| 4,852,929 | 8/1989 | Shafir | 294/99.2 |
| 4,973,095 | 11/1990 | Kunihisa | 294/99.2 |
| 4,976,718 | 12/1990 | Daniell | 294/99.2 |
| 5,056,173 | 10/1991 | Brincat | 30/142 |
| 5,373,640 | 12/1994 | Cordeiro, Jr. | 30/142 |
| 5,709,423 | * 1/1998 | Romero | 294/99.2 |

FOREIGN PATENT DOCUMENTS

| | | | |
|---|---|---|---|
| 3632-102 | * 4/1987 | (DE) | 294/99.2 |
| 1259920 | * 1/1972 | (GB) | 294/99.2 |

* cited by examiner

*Primary Examiner*—Dean J. Kramer
(74) *Attorney, Agent, or Firm*—Rory Farlan Krieger

(57) ABSTRACT

Abstract: An improved eating utensil. To attain this, the present design provides a utensil base (10) interconnected with both proximal and distal ends. Oriented al the proximal most end of utensil base (10) is a symmetrical counterbalanced handle member (28). Base (10) also includes angled asymmetrical tine members (14A,B) which are oriented along its' distal end. Which further includes interior jaws (17A,B). Wherein, interconnected distal members include elongated tong members (20A,B) horizontal crimping jaws (24A,B) and distal tweezer prong tips (22A,B). Urged manipulation against food morsels occurs along these interconnected distal members and the like.

14 Claims, 1 Drawing Sheet

UTILITARIAN COMBINATION UTENSIL

CROSS-REFERENCE TO RELATED APPLICATIONS

This is a new application based upon application Ser. No. 08/717,696, filed Sep. 23, 1996, which has been abandoned.

BACKGROUND

1. Field of Invention

This invention relates generally to eating utensils, and more particularly to a utensil that is a combination tweezer, tong and chopstick.

2. Description of Prior Art

A majority of "traditional" tableware utensils actually contain a plethora of structural and design flaws. These flaws range from something as surreal as their lack of universal compatibility, down to their profound inability to function in other multi-tasking ways. As such, these traditional designs call into question many troubling consequences. Among those, are the differing types of materials they use; their lack of ease-of-use, non-ergonomic features; and finally, various considerations for consumer's usages and culinary safety itself In summary, there are a host of "elements" that comprise egregiously flawed, inherently problematic, and injury prone utensils. Ultimately, hindering the consumer's need to efficiently manage tableware utensils.

Today, consumers engage in a broad range of culinary activities. Most of our needs have been met in striking ways by an overabundance of gizmos and gadgets already in the marketplace. In this group, are the familiar arrays of traditional kitchenware utensils, which include: tongs, skewers, forks, knives, spoons and chopsticks. As alluded to above, these "traditional" devices are not without their faults, including their inability to satisfactorily manage their basic functional tasks, much less more specialized missions from which they were intended.

It is strongly believed that current tableware utensils have categorically failed to please the discerning consumer in several specific ways. Areas that correspond to seven separate categories we call "preferred utensil characteristics", which are essentially categorized attributes that are critical to identifying universal compatibility among a majority cross-section of the population. These varieties will be examined and evaluated as we proceed.

Inasmuch as design flaws in prior art attempts can be compared and categorized against preferred design features, weighing the relative strengths and weakness of each prior art attempt, a comprehensive list of preferred utensil categories becomes evident. They are: universal compatibility, morsel management, multi-tasking functions, use of a flexible material, safety, a single-piece design, and lastly, the utensil's ability to provide a high degree of ergonomic objectivity during meals. These seven categories will be examined in the following section, and scrutinized against a select grouping of prior art designs.

DESCRIPTION OF PRIOR ART (CONTINUED)

The first category is "universal compatibility". Whether you're using a skewer, tong, spoon, fork, knife, or chopsticks, the message is still the same. That being, each one of them has a specific purpose. Obviously, able-bodied and handicapped individuals have dramatically different abilities. Of which neither group necessarily "owns" the correct balance of dexterity or inherent skill to take advantage of each utensil's specific features. This being as it may, a dilemma develops when a consumer is presented with any particular utensil for which he/she is unfamiliar. Case in point? Chinese chopsticks. Chopsticks are especially troubling for people in North America and other non-Asian influenced countries around the world. Thus, it can therefore be inferred, that a utensil's design, must reflect a universal sensitivity to a plurality of diverse skill levels. While at the same time, containing an appropriate amount of attributes (preferred utensil characteristics) to satisfy the broadest possible cross-section of humanity.

It is commonly known that significant numbers of people cannot adequately feed themselves with chopsticks. Many find that using chopsticks is a frustrating experience. Probably because of their background experiences and skills. Lacking the cultural background necessary to proficiently master Chinese chopsticks ranks highest on the list. Inasmuch as Western utensil designers are partially to blame, they continue to stay the course with edgy, sharp, stainless steel, plastic and wood materials' while, overlooking simpler, more intuitive innovations.

In contrast, non-metallic, FDA-grade materials provide viable substitutes, as they comply with the preferred utensil characteristics. These utensils can be especially useful for individuals who suffer from varying forms of physical disabilities and dexterous anomalies. Perfect examples of these people are found in the young, the old, and the disabled. Prior art designers have over-looked and neglected this vast segment of our population. Except for their physical limitations, these are people who are normal in every way, including accident victims, the blind and the informed. In short, people who are challenged by their inability to effectively grasp, retain, and take advantage of traditional utensil designs; people who are involuntarily resigned—by virtue of their disabilities, to depend on caregivers or costly institutional programs for a simple bite of food.

More importantly, what these people all have in common is a fundamental right to feed themselves. A well-known humanitarian once said that, "all people must be allowed equal access to the freedoms of this nation." And in this case, a simple utensil can liberate their most basic of eating conditions. Freedom to get off of institutional programs can be as close as choosing to use a "correct" eating utensil. A tool of the new millennium.

"Universal compatibility" bridges the gap between traditionally diverse groups of people, through the use of a "one-size-fits all" utensil, without the exclusion of anyone. The universal compatibility objective supplies the needs of the mass markets while being intuitively bonded with the human condition, where ergonomic comfort and compatibility is the key. By achieving universal acceptance in a single tableware utensil, this effectively invites the chopstick-challenged and other "disenfranchised" consumers into an expanding community; one that celebrates and reveres the condition of being handicapped, and those "assisted living" individuals with that of the mainstream, able-bodied society. Thereby the product supplies the overall needs to one global village—through the use of one universally compatible utensil. Thus, in the end, solving the universal compatibility issue and once and for all.

A second category is "morsel management." A majority of prior art designers have not adapted nor refined their utensils to provide for a multi-tasking range of uses. In order to achieve satisfactory management of food, a utensil must be designed for efficient hand-control over food morsels of varying sizes, shapes, densities, and "wetness." The tool should be nimble and light, having the ability to perform multi-use pursuits.

This dilemma can easily be solved by incorporating a plurality of piercing prong tips, and crimping/grasping members. For example, employing at least one pair of primary crimping members per utensil will greatly improve a utensil's carrying capacity, by which each crimping member clamps against objects and morsels. Whereas, employing the proven attributes of meat skewers, piercing prong tips may substantially improve the task of retaining oversized, hardened morsels.

Piercing through and clamping against food morsels then becomes a utensil's primary method of morsel collection. In effect, prongs act like skewers, which are very effective at piercing into sizable morsels, while offering the consumer outstanding control. Whereby, open crimping members may be used to clamp against the balance of lesser-sized morsels. As primary grasping members, prongs and crimping jaws may be used independently, or combined.

Used together, prongs and crimping jaws have the potential to make food gathering easier and more efficient than without. Clearly, this arrangement is a quantum leap beyond the narrow, hardened, squared-off tips that are found on a chopstick, much less, the steely tines common to the traditional fork. In contrast, crimping members and prong tips may offer a substantially higher degree of morsel management, and consumer satisfaction—in a single, culinary utensil.

Morsel management may further include the use of "secondary grasping" members, and can manifest in the form of interior arched, oval-shaped, tapered jaws. Jaws that are oriented along the interior of each incurvature tine member. These elongated, oval-shaped "edged jaws" may become highly useful in grasping solid, dense morsels, such as a carrot, a crab leg, or perhaps a potato.

Moreover, "passive collection" methods may also exist. Passive collection members may take the form of something as subtle as a tactile feeling, textured surface. This may occur if a consumer presses the bottom side of a utensil down and against minuscule food morsels. Causing trace food particles to compress and stick against the bottom forward (distal) end of the utensil. Offering a textured exterior surface will naturally enhance this type of "compression hold". Therein, assisting the consumer in collecting trace morsels. Overall, if primary, secondary and passive food collection members are combined into the embodiment of a single-pieced utensil; then the net effect allows a consumer to virtually capture all types of semi-solid, to solid food morsels; thus resulting in a highly effective, combination tableware utensil.

A third category is "multi-tasking." Generally speaking, multi-tasking is a function that crosses-over from one specific task into another. Inasmuch as some prior art attempts have tried to offer spoons, forks, knives, and chopsticks into their multi-pieced units; they have, at the same time, inadvertently failed to achieve any one or more of our preferred utensil characteristics. Consequently, their devices have malfunctioned and broken apart under "normal", repeated use.

However, when convenience and portability are considered, consumers have shown a preference toward high utility, integrated devices, "tools," if you will, offering functionality and options, integrating multi-tasking members into a utensil, facilitates convenience and portability. By incorporating the familiar attributes of tongs, skewers and chopsticks, a multi-tasking utensil may well overcome the inherent limitations of traditional utensils. Combined, these attributes serve as viable substitutes, resulting in a combination utensil - cleverly integrated into a single-unit design.

The fourth preferred category is "flexible-rebounding." Unfortunately, most prior art forms are rigid and non-flexing. This is often the case when using an abundance of rigid steel members, stainless steel pins, springs and metallic carrying frames. Some designers have even included adjustable locking means that further complicate their devices. None are essential, or suitable for elegant or casual dining purposes.

Metal utensils are durable and long lasting. However, by virtue of their material, they create injuries. A non-metallic "flexible solution" must be found. A flexible material will rebound. Rebounding does away with mechanical componetry. Rather, the preferred utensil paradigm recommends using an FDA-approved, thermo-plastic elastomeric composite materials (TPEs). TPEs are rubber-like and soft to the touch. TPEs allow the total length of the eating utensil to recover after being twisted, flexed and/or contorted. They are easily cleaned and are stain resistant. Their innate ability to rebound and recoil back to an original static position make TPEs a preferred material for the utensil paradigm.

A fifth category in the preferred utensil paradigm covers the aspects of "safety." Many art designers have made little effort to safeguard consumers from inherently unsafe materials. As mentioned before, metal is one of the most common culprits, making for sharp, lethal edges. A close partner in crime is breakable plastic. Or in the case of Chinese chopsticks, splintering wood and plastic. All utensils made from these materials may develop sharp, blunt, webbed, ribbed or serrated edging, resulting ill the inadvertent swallowing of accidentally broken-off pieces.

Specifically, let us consider the use of three common kitchenware utensils: the table fork, the food-serving tongs, and our favorite, Chinese chopsticks. A fork uses sharp tines, which are plentiful in number, and made from rigid metal. Food serving tongs are often stamped from serrated stainless steel or ABS plastic. These devices are pre-loaded by way of metallic springs and retaining pins, many of them having jagged, razor-sharp webbed teeth.

Plastic and wooden-made chopsticks are breakable materials. And because of this, pieces can fragment or splinter, and become lodged in someone's gums, mouth and esophagus. Clearly then, there is an overriding degree of peril that may effect all consumers who willingly use utensil products made from these materials. This horror becomes heightened when these products are placed in the hands of the informed, the handicapped, or developmentally disabled individuals. Again, TPEs address this problem.

Likewise, multiple-component utensils often result in breakage. Which introduces our sixth preferred category, that being, "a single-unit design." Compared to multiple part devices, a single-unit is far less complex and simpler to use, and, it tends to be more durable and resilient to stress. Whereby, as we eliminate the number of components, simplicity is a key factor. A single-piece design greatly reduces inadvertent breakage, accidental cuts and the like. Thus, a single-unit utensil is far more durable and resilient for daily use than problematic, multiple-component designs.

Our seventh and final category is "ergonomic comfort." Ergonomics is the science of product interaction with the human condition. Here, it is manifested in terms of length, contour, gripping ability and balance. By shaping a utensil into a primarily flat, solid and resilient-elastic body, this orientation allows many advantages.

First, it has structural integrity and tactile comfort. Tactile—because the user can squeeze it and utilize it's natural flexing characteristics to crimp-down on various morsels. Second, a substantially flat portion along the top and bottom surfaces—allows many like-shaped utensils to stack on top of one other. Third, a flat utensil tends to be easier to balance in the hand. Finally, a flat utensil cannot it roll-off one's plate or eating surface when dropped. Thus, a utensil designed with a high degree of tactile control and sure-handed flexibility, plays well into user-friendly ergonomics. Allowing a consumer's ease of operation over the utensil, and sure-handed management over culinary items.

In short, some design characteristics are clearly more useful, safer and advantageous than others. Re-engineering a new paradigm for culinary purposes is a necessary "evolution." From our review, it becomes clear that a standardized platform of the seven preferred utensil characteristics is imperative. This platform underscores the special needs of the utensil-using community, while servicing the broadest cross-section of humanity.

In summary, our preferred utensil has evolved into a highly functioning tableware accessory. Thus offering the consumer a high degree of morsel management, by which multi-tasking functions are plentiful, within a design conceived from a single-piece material with upper and lower flat portions, made from thermo-plastic elastomeric materials, which provide inherent flexibility and rebounding characteristics. A utensil that is easy to grip by virtue of its textured surface, and encapsulated within an ergonomic balance and safety contoured design; therein resulting in a highly effective, universally compatible and user-friendly tableware utensil.

Related References

Designs of the past have adapted traditional forks, spoons, knives, skewers, tongs, chopsticks and the like into both singular and multiple combination devices. For example, U.S. patent Des. 215,468 to Callahan, Jr. (1969) discloses a Food-Serving Tongs or the Like. His device uses flat serving tong members, which clamp against small objects. Similar to a pair of tweezers, Callahan's food serving tongs do not utilize a sufficient opening to securely grasp—nor surround food morsels. His device does not allow for twisting or rebounding of the base members, thus creating a toilsome effort when attempting to grasp morsels of varying sizes, densities and wetness. Furthermore, this ornamental design is fragile and breakable. Neither does his design facilitate a consumer's need to pierce into food morsels, much less "scoop or shovel" morsels.

Moreover, Callahan's design is not ergonomically contoured to accommodate ease of use when held by the hand. Which severely limits any reasonable degree of morsel management, while impeding the prospects for universal compatibility. Lastly, Callahan's device also lacks multiple grasping means. Rendering his serving tongs ineffective, and poorly suited as an eating utensil.

In U.S. Pat. No. 3,889,995 to Chun-Cheng Lin (1975) shows a Pinching Type Chopsticks with Locking Means. One end of both pinching members is jointed together having "longitudinally disposed L slots" within a sliding-pin, which serves as a locking means. Yet, for several reasons, this device cannot adequately function as an eating utensil. First, the base unit is made from a rigid, inflexible material, using pinching members that are narrow and cannot twist, and limited by singular grasping means.

Secondly, Lin's design does not allow the user to experience tactile sensitivity when grasping morsels. As for ergonomics, this design is short and rigid in shape. Which complicates the prospects for an easy grip while lacking the creature comforts associated with ergonomic balance and user-friendly design. Compounding his mistakes, Lin uses a sliding-pin to lock the pinching members in place. An egregious accessory that is totally unnecessary—as is his use of metallic parts with rigid and dangerously sharp edges. In terms of satisfying a consumer's need for ease of use and simplicity, Lin's design is profoundly restrictive, insensitive to human ergonomics, and profoundly "mechanical." All of which results in a violation of the universal compatibility, safety and morsel management parameters.

In the example of U.S. Pat. No. 4,707,922 to Hosak-Robb (1987) shows an Eating Implement with Tong-Like Rod Members and interconnected by a resilient-elastic web. Hosak-Robb's design uses pointed ends and tong members which spring-back to an original position. Strangely, Ms. Hosak-Robb's device appears to be a modified pair of tweezers. Clearly, the structural design of tweezers does not contain adequate elements of an eating utensil. His device is devoid of ergonomically smooth and rounded surfaces, which are essential when considering universal compatibility. In terms of safety, Robb's tong members terminate into sharp, rigid, piercing fork-like tips, making this device unsafe and extremely hazardous for the user.

Moreover, Hosak-Robb's implement lacks specialized and secondary grasping members, while relying solely on its parallel, rod-like members to contain food for eating. This severely limits the eating implement's ability to adequately manage varying types of food morsels. Lastly, this device does not contain universal compliance modifications, multi-tasking advantages, or practical considerations for ergonomic comfort. Therefore, the restrictive design of Hosak-Robb's eating implement violates all preferred utensil characteristics. As it is, it's ill-equipped to satisfy even the most basic of culinary utensil functions.

Furthermore, U.S. Pat. No. 4,728,139 to Oretti (1988) shows Tongs having a pair of flanged arm members, including sharp recesses with jagged, inner facing teeth. Oretti claims his tong device has inherent flexibility, perhaps by way of its cantilever design where tongs are adapted to permit its jagged inner-teeth to be brought into contact at its free-end for purposes of gripping an object, and having a moveable carrying frame, adapted to hold the opposing flanged arms in a static, fixed and substantially closed position. In terms of an eating utensil, the use of any locking mechanism is unnecessary, egregious and considered counter-productive for casual use.

As a food serving tong, Oretti's device is well conceived. Unfortunately, by virtue of its size, jagged edges, metallic components and rigid members, this device cannot function as a tableware utensil. Oretti's tongs violate many crucial considerations of the preferred utensil characteristics, rendering this device ill-suited for tableware use.

Moreover, Oretti's design completely overlooks and disregards the universal compatibility category. Structurally, it lacks multi-tasking accessories, suchas rubberized tong handles, or an easy gripping texture; both of which are necessary for a positive handhold, and control. Secondly, Oretti uses a multi-piece design. Again, multiple components are problematic. They are sharp. They have been known to break-off, malfunction, and become swallowed during use, creating a hazardous environment for the consumer.

Thirdly, although Oretti claims his tong has inherent flexibility, his device still cannot twist, nor elastically stretch. Much less rebound, as is the case with stretchable materials; as compared against a utensil made from rubberized flexible materials. Fourth, a tong is not an eating utensil. This is because Oretti's device uses a series of angular, blunt and webbed members, positioned along its mouth insertion areas; it includes a plurality of dangerous, razor-sharp, jagged and scalloped shaped teeth. These members seriously compromise safety, as they promote a high probability of cutting, gouging and piercing through internal mouth organs.

Lastly, Oretti's tong is not ergonomically designed as a tableware utensil. It almost completely lacks any degree of tactile subtly or intricate finger-sensitive control that consumers require, precluding yet another essential characteristic, that being, balance. Ergonomics is thereby sabotaged by virtue of his use of an extraneous carrying frame, and should be dismissed as a utensil.

Additionally, U.S. Pat. No. 4,976,718 to Daniell (1990) shows a Parasite Remover. Daniell's parasite remover contains a pair of inter-digitating teeth. However, in terms of a tableware-eating utensil, this device is totally irrelevant. Clearly, this device is for the grasping of parasites, not edible food morsels. Thus, it violates the universal compatibility criteria, morsel management, as well as multi-tasking, flexible rebounding, safety, and ergonomic comfort. All of which are crucially essential to satisfy the preferred utensil paradigm.

Moreover, U.S. Pat. No. Des. 357,846 to McNaughton (1995) shows a Toaster Tong. His design uses rigid, angular tong-shaped members that have distal teeth, a flat and pointed body surface, and a narrow opening at its distal tips. Unfortunately, this device cannot discriminately select various sized morsels in lieu of its toast-specific grasping purposes. Why? Partly because its tongs are limited by their lack of variable opening widths, thereby failing the critical, morsel management criteria.

McNaughton uses a pair of singular distal grasping means, thereby failing the multi-tasking requirement. By virtue of his rigid tongs having jagged edges, he overlooks safety and ergonomic comfort as well. Moreover, his product does not offer to the physically challenged, any simplified method for eating. Lastly, these toaster tongs cannot elastically twist nor stretch, all of which amounts to a toaster tong ill-equipped to function as a daily, tableware utensil.

U.S. Pat. No. 4,973,095 to Kunihisa (1990) shows an Interconnected Chopsticks device. Two parallel chopsticks form the basis of his design, which are interconnected by transversely extending a spring member between the two chopsticks, forming a perpendicular extension. The spring member includes an ornamental design that interconnects and locks the two chopsticks at approximately their midpoints. Again, as we've discovered in previously discussed designs, locking members create static, closed positions. This approach is counter-productive for casual tableware protocol.

Furthermore, based on the premise that flimsy parts may break-off during use; one can deduce that this device is not safe for daily, culinary uses. His inclusion of interconnected and protruding parts raises the specter of breakage issues, especially for persons who require simplicity and durability. Moreover, this design clearly requires the use of fingers, a gross oversight for the developmentally disadvantaged and handicapped. It also violates the universal compatibility requirement by virtue of its established chopstick design; the very same design by which consumers jealously seek to avoid. In short, this device lacks morsel management and multi-tasking functions, as well as failing many safety issues. Thus, Kunihisa's interconnected chopsticks fail each and all of the preferred utensil characteristics.

Lastly, U.S. Pat. No. Des. 374,379 to Jee et al. (1996) shows a Chopstick device using a single piece design, wherein, Jee incorporates a series of bends designed for rebounding to a static open position. Though his device is substantially similar to standard Chinese chopsticks, it too lacks the preferred characteristics that would otherwise bring it into compliance. Aside from the use of bends, Jee's design has substantially the same limitations as common chopsticks. As such, her design is not universally compatible. Secondly, her chopstick lacks differentially disposed, multiple grasping means that were previously described. Moreover, its distal tips are squared-off, which, by nature of their design, substantially reduce any opportunity to pierce through morsels, thereby, failing the morsel management and multi-tasking requirements.

Thirdly, her design is made from breakable and fragile plastic, lending to its high degree of breakage, and possible ingestion of broken-off material. Fourth, she has chosen to exclude balancing members on the base unit. Lastly, her use of a series of bends actually makes handling the utensil confusing, whereby, consumers may temporarily wonder as to which end of the utensil is used to grasp morsels. All told, Jee's chopstick violates all preferred utensil characteristics. It fails to promote tableware efficiency and thus, negates its viability as a daily utensil.

Conventional utensil devices are problematic. Specifically, the above-cited designs have proven, through empirical testing, to fail the challenge of preferred utensil characteristics. Most of these referenced designs are dangerous, or merely non-compliant for universal compatibility. They can also cause serious, ill-health effects.

Compounding matters, many designers use a series of multiple-hinged, and independently moving parts. Furthermore, their threshold of safety is compromised by the multiple-use of sharp, jagged, steel fittings, wherein again, multiple parts can easily be swallowed, and should be avoided whenever possible; including rigid parts that flex, break, shatter and may be inadvertently swallowed. Other parts are inherently sharp, rigid and show a high proclivity for cutting and gouging a consumer's eyes, face, mouth, gums and throat.

The above hazards may occur, whether or not these design flaws are patent or latently obvious. Lastly, prior art attempts have not effectively addressed design modifications that might assist individuals having specialized, handicapped or age-related needs. In short, prior art designers have flagrantly neglected certain groups of people whose lives are dependent on adaptive products to simply feed themselves.

Specifically, there exists a broad category of consumer products known as the 'adaptive products' market. This market caters to the needs of not only mainstream society, but also focuses on the young, elderly, handicapped, and disabled consumer. Adaptive, cross-disability and solution-oriented products are designed with a greater emphasis on universal convenience, ease of use, compatibility and simplicity; items that are instinctive, intuitive and highly ergonomic; products that are designed to be quickly mastered, with a minimum of training. Thus, establishing a foundation that furthers the progress within the adaptive-products market.

Therefore, the re-engineering of our current, traditional tableware products is mandatory. Swinging-open the doors of innovation for designers having enough ingenuity and compassion to supply the greatest numbers of humanity. Research and development will bear-out a practical, true, multi-tasking combination utensil; a tableware tool that accommodates the subtle ergonomic structure of the human hand, while advancing comfort, irrespective of age, disease, and many other types of physical challenges; a utensil that employs practical, efficient and effective methods of control over a majority of food morsels; a vision for a new, revolutionary utensil that utilizes differentially opposed, multiple grasping, primary, secondary and passive grasping members; a utensil incorporating multiple safety characteristics, a single-unit design, having a considerable range of inherent flexibility and usable life. An intuitive utensil that promotes long-lasting durability, as it overcomes the numerous shortcomings and debilitating consequences of prior art attempts.

Thankfully, the above virtues can be achieved through the use of a non-metallic, thermo-plastic elastomeric material, offering consumers a product with ease of use, arid housed in one, user-friendly utensil. It offers people continuous, ergonomic benefits and multiple gripping surfaces, and being especially useful for people who are physically disabled, developmentally challenged, young, old and of any dexterity level. Lastly, a utensil that offers a common sense, practical solution for people who find traditional Chinese chopsticks too challenging, frustrating and nearly impossible to use.

Objects and Advantages

Previous utensil designers have adapted forks, spoons, knives, skewers, tongs, tweezers and chopstick devices into singular, and multiple-part devices. Sadly, architects of these devices have done little to improve or innovate around the inherent problems typified through traditional utensil designs. Specifically, our previous review of prior art designs has revealed a disturbing and bizarre assortment of engineering misadventures, grossly ignoring basic consumer needs relative to preferred utensil characteristics. Moreover, prior art devices do not universally afford ease of use for the aged, the physically handicapped, nor persons with other special circumstances and needs.

Notwithstanding the above qualifications, a newly designed combination utensil has been developed. Generically referred to as the Utilitarian Combination Utensil (U.C.U.). The U.C.U. device is extremely innovative, ingeniously simple and unique from previously discussed prior art forms. The U.C.U. achieves this uniqueness through its strict adherence to the preferred utensil characteristics.

By design, the U.C.U. was developed with consumers in mind. It does so by combining the "essential elements" of a chopstick, tweezers, and tong; an elegant blending of form, multi-tasking fit, and three-in-one functions. Truly, an intuitively conceived utensil having all seven preferred utensil characteristics in one, thereby, allowing the U.C.U. to successfully overcome all the limitations of the crude and hapless predecessors already discussed.

Accordingly, several objects and advantages abound with the U.C.U. Molded into a single-piece design, this combination utensil has originated from a distinctly utilitarian purpose, and formed entirely from a material having substantial tensile flexibility, uniform durometer and consistent rebounding characteristics. Its ability to recover after being squeezed and deformed is unique. Two of the U.C.U.'s most latent features are its contoured shape, and intuitive ease-of-use grip. Employing the use of multiple gripping surfaces, this utensil utilizes a multitude of highly effective means to control food morsels, allowing even the handicapped to take full advantage from its use.

In short, the utilitarian combination utensil has more than mastered its servile duty, that being, to aid a majority of all people ill feeding themselves. In an age where prior art attempts have floundered miserably and failed to deliver a suitable day-to-day multi-tasking culinary utensil, the U.C.U. raises the bar to a completely new level, surpassing the dangers and inherent limitations of prior art attempts.

Aside from the obvious advantages of being a multi-tasking culinary utensil, there are additional objects and advantages of the present embodiment. Those advantages are:

(a) to provide a single base unit, with proximal and distal ends, designed for use by left and right handed individuals;
(b) to provide a substantially flat, solid base-unit on both its top and bottom sides;
(c) to provide a utensil whereby the absence of a consumer's fingers does not undermine nor limit its utility functions;
(d) to provide opposing tine members which include interconnected, distal grasping means;
(e) to provide distal grasping members designed for urging-against and grasping upon relatively large, small, wet and irregularly shaped morsels;
(f) to provide distal prong tips for multiple purposes which include navigating through morsels and piercing into sizable, chunky, crispy and irregularly shaped items;
(g) to provide distal prong tips which are sufficiently contoured and rounded for purposes of safety when eating;
(h) to provide horizontal crimping jaws for purposes of grasping food morsels;
(i) to provide a distal underside surface for pressing down and urging against minuscule food morsels, for purposes of passive, compression collection;
(j) to provide elongated tong members that allows for the adequate length in negotiating and penetrating through food morsels;
(k) to provide medial connecting members with sufficient flexibility for purposes of maneuvering food morsels around and away from a food receptacle;
(l) to provide angled, asymmetrical tine members with distal ends, incorporating gripping means;
(m) to provide a distal prong resting hollow;
(n) to provide an open elongated gap between tine members;
(o) to provide continuous interior tapered jaws;
(p) to provide tine members with a continuous smooth interior sloping arch;
(q) to provide a tine gudgeon at the interior convergence of the tine members;
(r) to provide a flexible medial juncture having rebounding characteristics;
(s) to provide a symmetrical counterbalanced handle member which facilitates ergonomic balance, thereby creating a perception of creature comfort;

Objects and Advantages (continued)

(t) to provide a textured surface throughout the base unit for purposes of positive hand-to-utensil sure-grip; and
(u) to provide a fully functional, user friendly utensil for use by consumers with "normal dexterity," thereby accommodating persons with physical and developmental disabilities; also accommodating children, senior citizens and other persons having a plethora of challenges and "special circumstances."

Another cadre of advantages are derived from this utensil's streamlined design: its smoothly flowing surface and sensual curves make handling, and clean-up a snap. Its curves are conducive for a comfortable, ergonomic grip, even when the consumer's hand, etc. is wet and/or deformed. This subtle attention to detail allows virtually every person to benefit from the utensil's inherent, nimble dexterity. While at the same time, enjoying an unprecedented degree of control and grace during meals. Still, further objects and advantages will become apparent from a consideration of the drawings and ensuing description.

BRIEF DESCRIPTION OF DRAWINGS

In the drawings, closely related figures have the same number, but different alphabetic suffixes.

List of Enumerated Parts

No. 10 Tweezers tong chopstick utensil base.
No. 11 Textured surface.
No. 12A,B Medial Connecting members.
No. 14A,B Angled asymmetrical tine members.
No. 15 Tine gudgeon pivot point.
No. 16 Open elongated gap.
No. 17A,B Interior arched tapered jaws.
No. 18 Distal prong resting hollow.
No.1 9A,B Smooth interior sloping arch.
No. 20A,B Elongated tong members.
No. 22A,B Tapered distal tweezers prong tips.
No. 24A,B Horizontal crimping jaws.
No. 26 Flexible medial juncture.
No. 28 Symmetrical counterbalanced handle.

Figure 1:
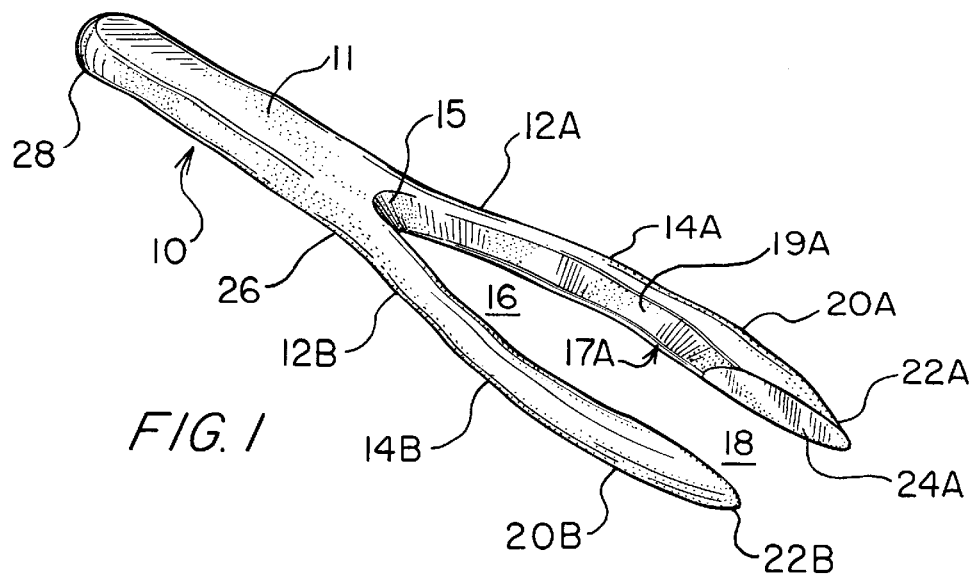
FIG. 1 shows an angled perspective view.
Figure 2:
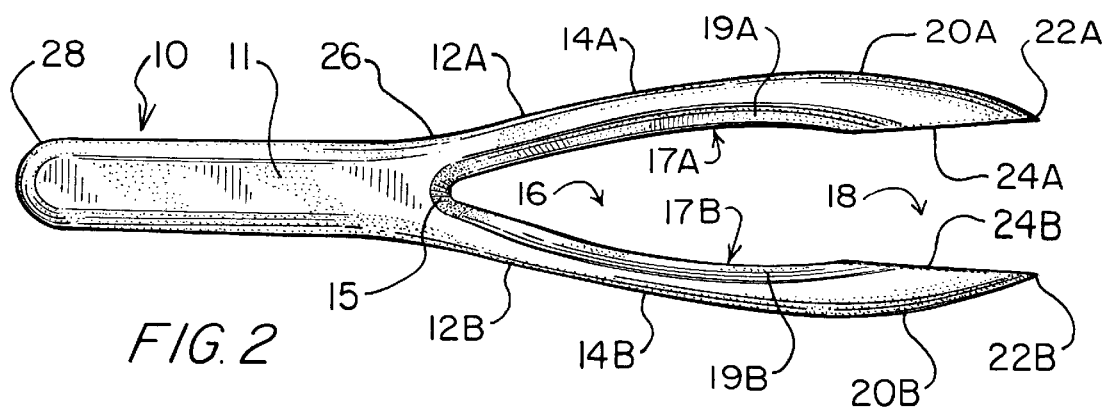
FIG. 2 shows a top plan view.
Figure 3:
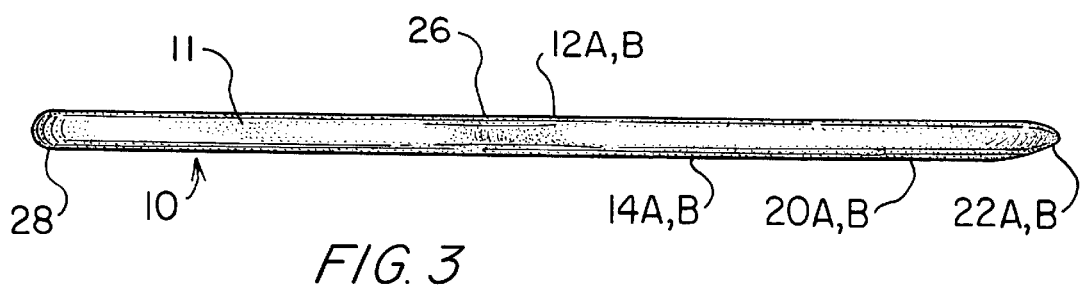
FIG. 3 shows a side view.
Figure 1:
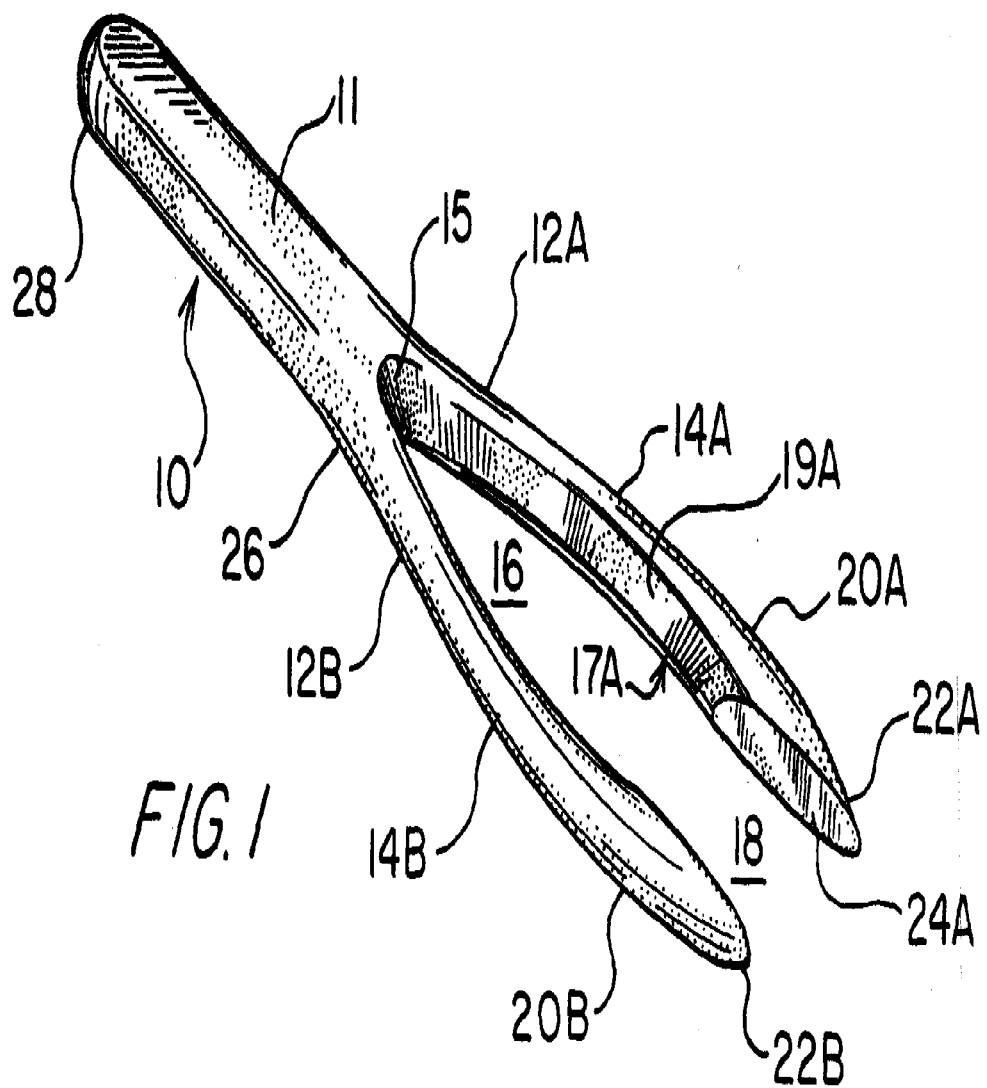

Detailed Description of Invention-FIGS. 1 to 3

Referring to the drawings in detail where like elements are indicated by like numerals, FIG. 1 shows an angled perspective view of utensil base 10. FIG. 2 shows a top plan view of a typical embodiment of invention base 10. And FIG. 3 shows a side view. As seen in FIG. 3, base 10 is uniformly constructed, and measures five-sixteenths of an inch thick throughout. Moreover, the utensil base 10 utilizes both proximal and distal ends, having a top and bottom surface that are uniformly flat and parallel relative to each other.

Utensil base 10 incorporates characteristic features of a tweezers, a tong, and a chopstick. Overall, utensil base 10 measures seven and seven-eighths inches (7 ⅞") in length, and at its greatest girth, measures one and three-quarters of an inch (1 ⅓") wide, having a uniform thickness of five-sixteenths of an inch (5/16") throughout. Because its size is conducive for an easy handhold by various sized human hands, the general public considers the utensil suitable for use as a tableware utensil.

FIGS. 1, 2 and 3 clearly represent utensil base 10. Specifically, as we turn our focus to the distal end of the utensil base 10, we see a stunning array of interconnected distal members. At the most distal end, tweezers prong tips 22A and 22B are shown. Prong tips 22A,B are beveled and ogively shaped. FIG. 2 further shows the relationship of prong tips among other interconnected distal members. A one-inch (1") gap spans the distance from prong tip 22A to prong tip 22B.

Elongated tong members 20A,B are a seamless extension of each tine member. Each tong measures three-eighth's of an inch (⅜") wide. Horizontal crimping jaws 24A,B measure one and one-half inches (1 ½") in length. If we combine the prong tips in a measurement with the crimping jaws, they measure one and one-half of an inch (1 ½") in length. This is because only the very tip of the prongs are included in that measurement, in which the crimping jaws are integrated on the interior portion of each elongated tong member.

With respect to the horizontal base, each crimping jaw 24A,B has a vertical planed surface. Stated another way, the vertical planes of each crimping jaw are formed at right angles, with respect to the top and bottom parallel surfaces of its utensil base. Wherein, crimping jaws 24A,B make up a substantial portion of the distal prong tips 22A,B, as they are disposed in the distal prong resting hollow 18.

For purposes of comparison with prior art references, I have chosen to bundle together the interconnected distal members: distal members include the tong members 20A,B; horizontal crimping jaws 24A,B and the tapered distal prong tips 22A,B. These interconnected distal members, like the entire utensil base, measures a uniform five-sixteenths of an inch (5/16") thick.

As shown in FIGS. 1 and 3, tweezers prong tips are ogively shaped. Wherein, the prong tips are formed at the distal-most end of base 10, as measured over the top-half of the utensil. Prong tips begin to form an arch along the topside of tong members 20A,B and measure three-eighths of an inch (⅜") back from the final prong tip. However, from the horizontal underside, the ogively arching slope is longer, which begins to slope upward from three-quarters of an inch (¾") back from the distal most prong tip. Furthermore, the bottom arch extends up and past the half way thickness point of base 10, eventually extending up until the tweezers prong tips 20A,B are achieved.

Detailed Description of Invention-FIGS. 1 to 3 (continued)

All told, the absolute tip is realized at one-eighth of an inch (⅛") below the topside plane of the utensil base, and three-sixteenths of an inch (3/16") above the bottom plane. Moreover, prong tips are part and parcel of the interconnected distal members, and considered primary food collection members, whereby, they comprise the most immediate point of contact with food morsels.

In FIG. 2 we see the top plan view, featuring the many interconnected members of the base utensil, notably, the first and second angled, asymmetrical tine members 14A and 14B. Tine members 14A,B are oriented at an acute angle with respect to each other. These are measured from the outer-most girth of each tine member, across to its corresponding side out-most side. This width measures one and three-quarters of an inch (1 ¾") wide. So, in order to make the prong tips touch, a nominal vector of one-half (½) to six (6) pounds of hand force is required in a squeeze, in order to cause prong tips 22A,B to touch. Next, as we move back toward the hand of base 10, we are said to be traveling in a proximal direction. As such, we encounter a pair of medial connecting members 12A and 12B. Medial members form a bridge from the tine members 14A,B toward a flexible medial juncture 26. Between these two points is a tine gudgeon pivot point 15. Pivot point 15 is the area where medial connecting members 12A,B contour and converge into one another; whereby, pivot point 15 forms the apex of base 10, as it joins to the flexible medial juncture 26, each medial connecting members 12A,B and tine members 14A, B. Each of these proximal connecting members is seamlessly interconnected to a symmetrical counter-balanced handle 28. The counterbalanced handle member 28 measures three-quarters of an inch (¾") wide, by three and three-eighths (⅜") of an inch long, having a corresponding semi-circular end measuring a diameter of three-quarters of an inch. This size is therefore considered sufficient to accommodate being held by a variety of differentially sized hands.

In FIGS. 1 and 2, base 10 is shown from its angled perspective and plan views, wherein, both figures clearly illustrate how utensil base 10 has a narrow top-surface, and a wider bottom-surface. Whereby, a substantial area of the top surface along each tine member has rounded edges, measuring one-eighth of an inch wide. In contrast to its corresponding bottom surface area which is substantially flat, and measuring five-sixteenths of an inch (5/16") wide. An inward slope is formed between the top and bottom planes of the tine. These are smooth interior sloping arches 19A,B. These arches are interior to the medial members 12A,B and tines members 14A,B. Sloping arches 19A,B extend downward at an incurvature angle, wherein interior arched tapered jaws 17A and 17B are forned and appear as a generally oval shape. Interior jaws 17A,B are oriented as bottom interior edges along each tine member. Tapered jaws 17A,B are considered a secondary pair of grasping members. As such, tapered jaws combine to form a continuous, wedge-shaped gripping edge. Therefore, each tine member 14A,B, continuously sloping arches 19A,B, and tapered jaws 17A,B, form corresponding mirror images to each other.

Moreover, FIGS. 1 and 2 clearly show an opening created between each tapered jaw. Corresponding to the tapered jaws 17A,B is an open elongated gap 16. Gap 16 originates at gudgeon pivot point 15, where 15 measures one eighth of an inch (1/8") in diameter. Gap 16 widens as it travels toward the interconnected distal area of base 10, and as it does, gap 16 merges seamlessly into another open area, and a distal prong resting hollow 18. Hollow 18 measures fifteen-sixteenths of an inch (15/16") wide, marking the widest opening between tong members 20A,B, whereby, this opening shows the static resting distal position.

Detailed Description of Invention-FIGS. 1 to 3 (continued)

Which leads toward the furthest forward distal edge of tweezers prong tips 22A,B, wherein the distance between each prong tip measures a width equal and consistent to one inch (1").

In the preferred embodiment, base 10 is formed from a resilient, vulcanized, thermo-plastic rubber material, which is a compound known in the industry as Santoprene. Santoprene itself is made from a family of high-performance elastomers, which successfully combines the performance characteristics of vulcanized rubber and provides flexibility at a low compression set, with the processing ease of thermoplastics. Processing and user performance of this material is considered comparable, if not superior to, most competitive vulcanized elastomers. After molding, this T.P.E. produces a durable, safe and FDA-grade utensil. Thus, Santoprene rubber is ideally suited for culinary purposes.

Santoprene is manufactured by Advanced Elastomer Systems in Akron, Ohio. By using their 8000 series, non-hygroscopic material, the utensil base may be formed in a variety of solid colors. Simply blending T.P.E. pellets with a desired percentage of colorant does this, therein, achieving nearly any hue desirable. We use Santoprene with a durometer (hardness rating) between 64A to 87A on the engineering A-scale. However, utensil base 10 may be formed from almost any resilient and rebounding material, provided that the chosen material allows tine members of the apparatus base 10 to recoil at a consistent rate, and at the same time, maintaining its structural integrity after repeated use and cleanings.

Moreover, throughout the exterior surface of base 10, we have chosen to include a texture. As specified by Advanced Elastomer Systems, a texture ranging between 0.020 and 0.080 is used. We've chosen to do this because texturization provides ergonomic control, and improving the utensil's morsel management coefficient by ensuring a more positive handhold in the presence of liquids, oils and sauces. Thus, the textured surface 11 covers a significant amount of the utensil's exterior surface.

In contrast, a review of the prior art designs serves as a reference to the reasons why they could not satisfy all seven preferred utensil characteristics. The first art attempt reviewed was the Pinching Type Chopsticks with Locking Means of Lin U.S. Pat. No. (3,889,995). A second patented failure is the Eating Implement of Hosak-Robb U.S. Pat. No. (4,707,922). Third, losing out in the stretch was the Tongs of Oretti U.S. Pat. No. (4,728,139). The fourth design that fell straight into the tank was the Interconnected Chopsticks of Kunishisa U.S. Pat. No. (4,973,095). And finally, the fifth patented attempt going south in a hurry, was the Chopstick of Jee et al. U.S. Pat. No. (Des. 374.379.

Operation of Invention

The utilitarian combination utensil (U.C.U.) offers consumers many practical applications; among them are primary and secondary morsel grasping means. In addition, food collection is optimized by the use of built-in, passive means. Worth noting, there are special individuals among the world's population who have physical, psychological and developmental disabilities. Unlike able-bodied people, handicapped individuals require special assistance in their lives. And to differing degrees, they rely on safeguards and special assistance to accommodate their daily, culinary needs.

As a prototype engineer, I am mindful of the peculiar differences among people. I design products for people who travel down many walks in life. I am a staunch believer that innovation, through intuitive designs, can throw open the doors of opportunity for all of humankind. As such, I believe that traditional tableware utensils are dated, dangerous and out of touch with the alternative lifestyle choices of consumers today, including the able-bodied among us. Our pledge is to offer the greatest number of people, the right kind of tools they'll need in order to realize a more independent way of life.

Admittedly, the use of tableware utensils can sometimes become difficult. This dilemma is compounded when faced with the prospects of using Chinese chopsticks. In fact, few people would argue that trying to grasp moist, irregular shaped food morsels is an easy chore. Often, it causes much aggravation and embarrassment. In the process, the splatter and loss of control is arguably enough to persuade most people to just give up. These experiences make innovators out of disgruntled consumers desperate for new, innovative tableware products. They seek something simple and casual to use, while innovative enough to successfully overcome the proverbial chopstick challenge.

Albeit, the list of conventional tableware utensils have been with us for many years. As such, they have maintained their steady place at our daily meal rituals. Yet at the same time, a growing segment of consumer-savvy population is casting-out traditional tableware, and replacing it with stimulating, life-style, casualware products. This shift is intriguing, because it has triggered an immediate response for new product development. Raising the bar in an exploding industry that is convenience and efficiency driven, and in the process, fine-tuning its products for the new breed of "seasoned, discriminating consumers."

As seen in FIGS. 1 and 2, the utensil apparatus base 10 forms the central core for this utensil. Moreover, the entire base member and interconnected nomenclature is molded from a single, solid, flexible, elastic and rebounding material. Nowhere is the solid core more visibly apparent than in its symmetrical counterbalanced handle 28, whereby, a flattened, semi-circular end forms its most proximal section.

Conversely, at the distal-most end of apparatus base 10, are distal prong tips 22A,B. In FIG. 3, we notice the tapered tweezers prong tips 22A,B, somewhat resemble pointed tear-drops. These tweezers prong tips are integrated with horizontal crimping jaws 24A,B and the elongated tong members 20A,B. Tweezers tips are considered the most complex and exacting grasping members of this utensil.

These tips are apart of the primary grasping means and are to be considered specialized accessories. Especially useful when a consumer wishes to grasp a small-sized morsel by which prong tips 22A,B are uniquely qualified to handle. Furthermore, when the user squeezes the opposing tine members 14A,B together, the static distance 18 between the tips shortens. Narrowing from one-inch (1"), down to the contact width of an engaged (compressed) morsel.

However, when food morsels are wider than the one inch (1") opening between the prong tips, the prongs may then be used to function as spears. Having softly pointed tips, the prongs can easily pierce through crispy, solid food morsels, lifting-out morsels from a food receptacle. Moreover, the tweezers prong tips are ogively shaped. This allows the consumer to insert the utensil into a pile of food and effectively grasp morsels from many different angles, thereby attacking morsels in a casual manner, and with impunity. This affords consumers the benefit of crimping, grasping or piercing into morsels of various shapes, sizes, densities and wetness. Once obtained, morsels are firmly held in place by any number of interconnected primary or secondary grasping members, thereby affording the consumer a high degree of culinary control over a majority of food morsels.

Horizontal crimping jaws 24A,B are also considered primary grasping means. Crimping jaws 24A,B are perhaps the most used grasping means available to the combination utensil. Designed to obtain control over some of the most irregular shapes of food morsels, these jaws are activated by squeezing the tine members 14A,B together, causing them to be drawn together and around targeted morsels for a positive grip.

Moreover, crimping jaws 24A,B provide ease of food collection in other ways. Jaws 24A,B may be used for scooping, but independent of tine members 14A,B. For instance, take the example of steamed rice, noodles, seafood and steak on a dinner plate. In this scenario, all that one needs to do is direct the utensil base 10 into the pile of food, and allow food to collect on top and in-between the interconnected distal members. Consumers may then simply raise-up the utensil to feed themselves. A majority of the time, consumers will pick and choose which grasping method is best suited for their needs. Truly, culinary discretion completely rests in the hands of the user.

Furthermore, relative to the above food-shoveling scenario, another distal member comes into play, that being the elongated long members 20A,B. Given the top-side width and orientation of the tongs, relative to the tine members and prong tips, tong members 20A,B offer two important benefits. First, they have flat surfaces, and secondly, they have length. Because of this, they function as a platform by which clusters of food will collect, allowing consumers to scoop-up larger portions of their meal, than without.

As seen in FIGS. 1 and 2, tine members 14A,B are separated by two expanded, static gaps. The first is the open elongated gap 16. This gap begins as an oval-shaped opening arid having a minimal radius, as measured from its origin at the tine gudgeon pivot 15. From there, gap 16 extends distally. Gradually widening to the point where it reaches its widest arch. Merging seamlessly into another void, that being, the distal prong resting hollow 18. Also in FIGS. 1 and 2 we see how the resting hollow 18 is positioned approximately at the center of the elongated tong member 20A,B. In its open static state, the resting hollow is considered sufficient in width to surround a significant variety of food morsels, that is, relative to its interconnected distal members. Together, open elongated gap 16 and distal resting hollow 18 comprise what is known as a "pre-compression gap."

Broadly speaking, the distal hollow was designed to allow the distal grasping members to remain sufficiently open when tine members are in their non-flexing, resting state. This resting state is therefore a resilient position, in which the tines widen and rebound to a static resting state, after having been squeezed together or otherwise distorted. As the user holds the utensil base 10 in his/her hand and directs the utensil onto one's food plate, morsels will naturally gather in and around this open area. Then, all that the user needs to do is merely squeeze the tine members together, securing morsels in place. Then, through the process of normal eating activities, the food will be deposited into one's mouth, thereby completing the task.

Logically, as tine members 14A,B are squeezed together, the distal prong resting hollow 18 narrows; and to a lesser degree, so does the elongated gap 16, narrowing the tines, prongs, crimping jaws and tapered jaws to the width of its intended morsel. In the absence of food, this pre-compression gap shrinks to zero, allowing prong tips 22A,B to actually touch on their distal-most point, whereby, the crimping jaws do not make a flush, plane-to-plane contact.

FIG. 3 shows this flat bottom surface of the combination utensil. The underside of the utensil has both flat portions and ogively shaped distal prong tips. This is the area responsible for passive food collection means - made possible by the exterior textured surface 11. Furthermore, the U.C.U. is covered by a textured surface 1. Texture aids not only in tactile control, but it also adds to the utensil's inherent grasping abilities, thereby, enhancing this utensil's overall abilities for passive food collection.

For example, take the case of grains of rice, and other small morsels. Typically these items remain in the plate long after the larger morsels have been removed. This is the point where a consumer using the U.C.U., has a distinct advantage over consumers using other devices. The U.C.U. may then be pressed down and moved around in a "sweeping motion" across the food plate. Thus causing small food morsels to compress and stick against the bottom, interior and sides of the utensil. This is important because most prior utensil devices lack any passive collection means. Thus, manifesting the promise of passive retrieval methods of the U.C.U.

In FIGS. 1 and 2 it can be inferred that squeezing tines members together, produces flexing in various points along the utensil base. Squeezing is thus a function of three elements: First, the flexible Santoprene thermoplastic elastomer material (T.P.E.), whereby, Santoprene consists of highly cross-linked rubber particles, dispersed throughout a continuous matrix of thermo-plastic material. This composite results in a combination of mechanical properties, fluid resistance, flame-retardant and environmental stability. This material is dishwater and dishwasher safe, having a high FDA, non-toxic rating; thus promoting durability and a long working life.

Secondly, the area where most flexing occurs is along the medial section of the tines. Hence, the medial connecting members 12A,B mark a point where each line flexes a substantial amount. This is also the point where balance is achieved between the proximal and distal ends of the utensil base. Finally, the flexible medial juncture 26 marks the area where a lesser amount of bending and twisting occurs, relative to the utensil base 10 and each associated Line member. Each of these connecting members were designed in "flex zones" which function in conjunction with the overall, inherent rebounding characteristics of the overall utensil base 10.

Moreover, during use, a secondary pair of grasping jaws further aids the consumer. Seen in FIGS. 1 and 2, these are referred to as the interior arched tapered jaws 17A,B. Unique in design and ingeniously conceived, tapered jaws 17A,B are oriented interior to each tine member, and formed as a consequence of smooth interior sloping arches 19A,B. Specifically, interior jaws provide a specialized function: to discernibly grip food morsels placed in a perpendicular orientation, perpendicular with respect to the open elongated gap 16 of base utensil 10.

One way of illustrating how the tapered jaws work, is to consider one test example. Suppose a consumer wishes to eat a whole carrot. According to the design configuration of this utensil base, piercing or crimping a carrot may not always be feasible. Instead, using the tapered jaws 17A,B a consumer then may utilize a secondary set of grasping means—making the above task easy. This is done by orientating the carrot inside the open elongated gap 16, of tine members 14AB, by squeezing against the tine members, interior jaws 17A,B will clamp against the carrot, in a more or less perpendicular orientation, and allows the consumer to secure the carrot with relative ease and convenience.

Moreover, secondary grasping members pick-up where primary members leave-off.This is the case when consumers use interior jaws to feed on hard, rounded morsels. However, a consumer may choose to employ the utensil in other ways, holding a smoker's cigar for example. Likewise, the same concept becomes clear; the utilitarian combination utensil offers the consumer a plethora of multi-tasking functions, whereby, secondary grasping members offer the consumer collection methods not normally suited for its primary members. But in the end, allowing an additional level of control over uniquely shaped morsels.

Conversely, previously cited prior art attempts have failed to consider many consumer needs. They have failed to develop, refine, or implement multiple grasping members; members that may similarly be found in a combination utensil. Therefore, as consumers go through the harrowing misfortunes associated with use of previously cited prior art attempts, they will unfortunately experience varying degrees of misfortune. Namely, comnpatibility and multi-tasking issues. This is because metallic and multi-pieced members produce unavoidable hazards, in lieu of their lack of safety features or ergonomic features.

However, the prospects for future utensils are not nearly as hopeless, painful nor bleak. Amazingly, a solution has been painstakingly developed and made available for consumers the world-over. That solution is the utilitarian combination utensil (U.C.U)! Ingeniously developed as a practical solution for casual eating, while offering a simple, ergonomic design. Requiring a minimal amount of effort or learning. Ingeniously designed for people with radically different culinary abilities, the U.C.U. offers consumers the high level of control and comfort they demand.

Depending on the relative size of food morsels, the user can choose which distal grasping member best suits the variety of tasks at hand. Whether or not they use the tweezers tips, the horizontal crimping jaws or arched tapered jaws. Any of these may be employed individually, or in conjunction with one another. Suggesting that food gathering may take place in a mutually exclusive area, or anywhere along the interconnected grasping members.

Referring now to FIG. 2, it is inferred that in the absence of food, squeezing tine members together allows prong tips to make tip to tip contact. In this way, tine members will uniformly flex and travel at an equal rate. Of course, this would depend where along the tines or tong members one chooses to squeeze. This narrow contact point is consistent with the necessary amount of pressure applied against them. As the tips eventually touch, they do so without causing horizontal jaws 24A,B to make a flush, face-to-face contact.

This is achieved given an acute angle by which jaws are oriented along each corresponding tine member. The orientation of prongs to horizontal jaws actually allows food morsels to be drawn into the resting hollow area, so as to facilitate the gathering of morsels. This method is advantageous to the consumer. Benefiting the user with the ability to substantially collect all food morsels when they are seized upon.

FIG. 2 shows the symmetrical counterbalanced handle member 28. Handle member 28 is oriented at the proximal end of the utensil base 10. It was designed to balance across the palm or topside of ones' hand. However, that would depend on how one chooses to hold the utensil. Nonetheless, the counterbalance element reduces and significantly alleviates hand fatigue, resulting in exceptional ergonomic balance. All told, the utensil's user-friendly grip and ergonomic balance, makes for a highly efficient utensil, while taking full advantage of the human hand's primal ability to squeeze two flexible objects together.

Notwithstanding, there are ancillary benefits to using the utilitarian combination utensil. One of these benefits is found in the extraordinary level of forward and aft balance. Additionally, this design is both contemporary and elegant, incorporating a style all its own. Its smooth flowing lines and accenting curves are reminiscent of an actual poultry wishbone. The U.C.U. is symmetrical, solid and completely free of sharp edges.

In short, this highly refined ergonomic design greatly enhances a consumer's sense of user-friendly comfort. While at the same time, substantially reducing the painful, stabbing, and gouging injuries inherent to prior art designs. Thus, the U.C.U. was strictly designed to alleviate those problems. Even allowing persons with special circumstances to feed themselves with a minimum of effort.

Overall, the innovative simplicity of the U.C.U. is, without a doubt, novel and indistinct. Its natural design is intuitive, raising the category of tableware utensils to a new level of safety and convenience. From the description above, a number of advantages of the utilitarian combination utensil become evident. Those are:

(a) The general purpose of the present invention is to provide a universally compatible, morsel management utensil, containing inherent flexibility in its base. A utensil that facilitates multi-functional purposes, while promoting a high degree of safety value; and having a single-piece design that is molded into an ergonomically compatible shape. This utensil functions as a four-in-one combination tweezers, tong, skewer, and chopstick. It does so by permitting its user to discernibly pick and choose among food morsels of varying size, density, texture, and moistness. The U.C.U. achieves these standards in full compliance of all preferred utensil characteristics.

(b) The U.C.U. employs the use of tapered distal tweezers prong tips. Distal prong tips have a soft-pointed, teardrop shape. Given their uniqueness, a consumer may either grasp or pierce into morsels, allowing it to maintain control over relatively large, small, and irregularly shaped morsels. This design adequately manages wet noodles by virtue of its dependable, user-friendly gripping surfaces. Members that significantly reduce slippage and morsel roll-off, maintaining a distance between the prong tips that is substantially wider than the tine width of an average tableware fork. The combination utensil is prudently scaled for surrounding and seizing control over food morsels of significant size, texture, density and weight.

(c) The entire base unit is textured. The use of texture is important, given the fact that hands and food are typically moist during meals. A textured surface offers a sure-handed grip. It achieves this by substantially minimizing slippage, tine-twisting or morsel roll-off, thereby ensuring a positive palm and finger grip. Whereby, the consumer gains greater control over the utensil than without. This is especially useful when the hand is unsteady, or untrained in the use of this user-friendly utensil. The small textured ridges promote positive hand-to-utensil contact, promoting confidence and control in the hands of consumers, even when the hand is covered in oil, sauce or liquids; thereby, affording the utensil an accessory for passive food collection.

Operation of Invention (continued)

(d) Tine members have the added benefit of being asymmetrically contoured and angled. The smooth contours of the tines provide for an intuitively designed grip, with many user-friendly angles for easy control over food morsels. Overall, hand control is firm and positive. Such control is critical in situations when casual hand-to-mouth dexterity and culinary grace are required.

(e) Other benefits include the uniquely contoured distal connecting members. Interconnected distal members include: tweezers prong tips, horizontal crimping jaws, elongated tong members and the interior arched tapered jaws. Surfaces are smooth flowing and soft, allowing an ease of use. Combined with the counterbalanced handle member, distal grasping members allow the hand and wrist to efficiently attack food morsels without undue hardship, fatigue or maligned extremity control.

(f) The U.C.U. employs predetermined forward and midsection openings. Theseopenings are referred to as the distal prong resting hollow 18 and open elongated gap 16. Combined, these continuous openings facilitate the utensil's self-rebounding, static resting position. As such, there are no forces acting or being urged upon tine members 14A,B while in this static resting state.

(g) Tapered distal prong tips are highly specialized, built-in accessories; effective at piercing food morsels, these tips obviate any need for supplementary piercing or grasping-type members. These prongs are especially useful when picking-out minuscule morsels, or pressing down upon morsels for final plate cleaning.

(h) The use of elongated tong members, permit a forward extension between the tine members to the prong tips. in turn, elongated tong members offer greater length for which to pierce into food morsels than without. This allows the user to easily insert food into one's mouth and extract the utensil with confidence, control and safety.

(i) The use of a symmetrical, counterbalanced handle member at the utensil's proximal end is significant. This is because it effectively creates yet another ergonomic advantage over most prior art attempts. This proximal counterbalanced member was designed with substantial size and considerable weight in mind, providing for an equilibrium in weight at the point of the medial connecting member. Therein supporting an unparalleled blending of fit, form, and function.

Finally, someone has been successful and insightful enough to design a unique, three-in-one, multi-tasking combination utensil. The U.C.U. is not only practical and user-friendly, but it is substantially more efficient than conventional tableware utensils, including the plethora of prior patented art attempts. The result? A practical, user-friendly solution to the age-old chopstick challenge, putting to rest one less challenge facing cultivated society.

Summary, Ramifications, and Scope

From a reading of the specification and claims, it is inferred that the reader will comprehend the structure of the U.C.U., gaining a clear understanding of the many innovations surrounding this utensil device, while including its multi-functional applications for humanity.

Accordingly, many benefits become evident. These include: universal compatibility, efficient morsel-management and control. Also, the U.C.U. has multi-tasking abilities and inherent flexibility. Quality and safety were at the forefront in designing this utensil. Thus, this product utilizes a smart, single-piece design that is cleverly molded into a practical and stable flatware utensil, providing a viable substitute for the troublesome Chinese chopsticks, the perilous metal-tined forks, and thecumbersome, razor-edged food tongs.

The U.C.U. was also designed as an indispensable tool for the physically anddevelopmentally challenged. Included are the young and aged among us, and virtually all able-bodied individuals of most dexterity levels. The U.C.U.:

permits food morsels of varying size, shape, density, texture, and "wetness" to be securely grasped and controlled;

contains specially designed, interconnecting grasping members which overcome the familiar slippage, splatter, and frustration common to certain traditional utensil devices;

it permits the user to sweep the bottom of the U.C.U. across one's plate, therein, compressing and capturing minuscule food morsels along its lower distal members;

it incorporates a flexible medial juncture, medial connecting members and a tine gudgeon pivot point, which facilitates recoil and rebounding from its singular design;

it was designed as a flexible, multi-tasking, three-in-one utensil, for purposes of improved control and usability;

Summary, Ramifications, and Scope (continued)

its symmetrical, counterbalanced handle member produces a balance of weight, facilitating a subtle and harmonious blending of ergonomic efficiency, creature comfort, and ease of culinary use;

it is completely devoid of metal parts, employing the use of FDA quality, thermo-plastic elastomer materials; and it is molded into a design that is substantially safe and universally compatible among able-bodied and disabled individuals.

While the above description contains several specifications, these should not be construed nor implied as limitations on the scope of this invention. But merely as an exemplification of one preferred embodiment thereof Many other variations are possible.

Alternate ramifications and embodiments to this design may include an overabundance of jointed or removable members. Where distal grasping means may be substituted for grated, ribbed or pointed sewers, tines or the like. There may also exist elements that extend from the palm of one's hand, and function in concert with an alternate embodiment, such as an elongated spoon-shaped distal member, wherein a spoon shaped head may also embody a blade capable of actuating between one or more positions for purposes of cutting solids or collecting liquids.

Another embodiment may additionally include singular or a plurality of cutting blades; blades that combine with tube-like liquid collection means. Likewise, a handle member attached to a cutting blade member may also include distal piercing tines, resembling those of a fork. The proximal end of this embodiment may also include a spoon, knife, a tined apparatus, or chopstick members for purposes of cutting, squeezing or the like.

Notwithstanding, materials used in the development of alternative embodiment(s) may include any number of manmade synthetics or composites, including naturally occurring materials, or any combination of natural, synthetic or composite materials.

As such, there are a number of other alternatives that differ from the preferred embodiment. These might include removable distal handle members for which cleaning and sharpening may be required. Another variation might employ integrally folding knives, ribs, tines and/or spoon-shaped members, or any combination thereof, that can misarticulate, retain or channel liquids. These alternate variations may also be used for other non-culinary applications, including the use of electric heating elements or reciprocating devices. Thus, further differentiating an alternative design from the original preferred embodiment.

Furthermore, other variations may include a base member designed and modified to facilitate utility functions, not limited to non-culinary purposes. Functions such as: medical applications; electronic assembly or testing; engraving or inscription; automotive engineering or tooling; diagnostic analysis; any type of hand-oriented grasping aids; or any manner of engineering or drafting applications. The relative size, shape, color, conductivity, and method of articulation may also vary according to its specific application.

Summary, Ramifications, and Scope (continued)

Notwithstanding, another application for an alternate embodiment might differ substantially from those mentioned. Designs may consist in whole or in part as a hollowed-out, exterior shell-type configuration. In short, modifications may include a substantial number of benefits or limitations of the preferred embodiment.

As expected, the present design of the preferred embodiment, may of course be carried out in a plethora of other specific ways; methods that differ from those set-forth or implied upon herein, but without parting from the spirit and essential characteristics of the invention. As such, the present embodiment is to be considered as illustrative in all respects, and not restrictive.

Accordingly, all modifications coming within the meaning and equivalency range of the appended claims, are intended to be embraced within their legal equivalents, and not merely by the embodiments illustrated or examples given herein:

1. An eating utensil comprising:

a symmetrical counterbalanced handle;

a pair of opposing tine members extending from said handle, each having a distal end; said distal ends forming a pair of first horizontal crimping jaws, wherein each said crimping jaw has a tapered distal tweezer prong tip portion; wherein said tip portions are opposing and form an angular offset joinder; wherein the tip portions being joined together upon a squeeze of said tine members; and at least one opposing tine member having an interior arched tapered jaw; wherein said eating utensil has a narrow top portion and a widened bottom portion; wherein the opposing tine members form said narrow top portion and angle to form said widened bottom portion; wherein the eating utensil is made from a substantially flat, solid, resilient, elastic member along a length of the utensil.

2. The utensil of claim 1, wherein each of the tine members are incurvature to form a distal prong resting hollow forming a generally oval shape.

3. The utensil of claim 2, wherein said oval shape forms an open elongated gap and said distal prong resting hollow.

4. The utensil of claim 2, wherein the oval shape forms a second pair of horizontal crimping jaws against the opposing member.

5. The utensil of claim 1, wherein the symmetrical handle member is oriented at a proximal end of the eating utensil.

6. The utensil of claim 1, wherein the tine members are made of the same material as the symmetrical handle.

7. The utensil of claim 1, wherein the eating utensil is a one piece member.

8. The utensil of claim 1, wherein a center of mass exists at a medial connecting member along said length of the eating utensil.

9. The utensil of claim 1, wherein the horizontal crimping jaws comprise a flat portion oriented at a right angle to said flat, elastic member.

10. The utensil of claim 1, wherein the first pair of jaws crimping further comprises a pair of elongated tong portions.

11. The utensil of claim 1, wherein each tip portion forms a pointed spear head.

12. The utensil of claim 11, wherein said spearhead forms the offset joinder for food collection purposes.

13. The utensil of claim 1, wherein said squeeze is a force ranging from 0.5 to 6 pounds.

14. The utensil of claim 1, further including an exterior textured surface.

* * * * *

UNITED STATES PATENT AND TRADEMARK OFFICE
CERTIFICATE OF CORRECTION

PATENT NO.    : 6,276,734 B1
DATED         : August 21, 2001
INVENTOR(S)   : Rory F. Krieger It is certified that error appears in the above-identified patent and that said Letters Patent is hereby corrected as shown below:

<u>Title page,</u>
Item [57], ABSTRACT,
Line 3, "Oriented al the proximal" should read -- Oriented at the proximal --

<u>Drawings,</u>
Fig. 1 should be deleted and substitute therefore Fig. 1, as shown on the attached title page.
Delete Fig. 1, and substitute therefore Fig. 1 as shown on the attached page.

Signed and Sealed this

Twenty-seventh Day of August, 2002

*Attest:*

JAMES E. ROGAN
*Director of the United States Patent and Trademark Office*

*Attesting Officer*

(12) United States Patent
Krieger

(10) Patent No.: US 6,276,734 B1
(45) Date of Patent: Aug. 21, 2001

(54) UTILITARIAN COMBINATION UTENSIL

(76) Inventor: Rory F. Krieger, 15 Paramount Pkwy., Lakewood, CO (US) 80215

(*) Notice: Subject to any disclaimer, the term of this patent is extended or adjusted under 35 U.S.C. 154(b) by 0 days.

(21) Appl. No.: 09/498,498

(22) Filed: Feb. 4, 2000

(51) Int. Cl.$^7$ ............................................. A47J 43/28
(52) U.S. Cl. ............................. 294/99.2; 294/3; 30/322
(58) Field of Search ........................... 294/99.2, 1.1, 294/3, 8.5, 11, 16, 33; 30/142, 322; D7/643, 683, 686; D28/55; 7/110, 112, 900

(56) References Cited

U.S. PATENT DOCUMENTS

| | | | |
|---|---|---|---|
| D. 212,067 | * 8/1968 | Pearce | D28/55 |
| D. 215,468 | 9/1969 | Callahan | D7/686 |
| D. 297,899 | * 10/1988 | Kato | 30/324 |
| D. 357,846 | 5/1995 | McNaughton | D7/686 |
| D. 374,379 | 10/1996 | Jee et al. | D7/642 |
| 1,889,475 | * 11/1932 | Henkel | 294/99.2 |
| 3,291,476 | * 12/1966 | Calkin | 294/33 |
| 3,889,995 | 6/1975 | Lin | 294/99.2 |
| 4,261,608 | 4/1981 | Bradshaw | 294/99.2 |
| 4,707,922 | 11/1987 | Hosak-Robb | 30/322 |
| 4,715,639 | * 12/1987 | Nicoletta et al. | 294/99.2 |
| 4,728,139 | 3/1988 | Oretti | 294/99.2 |
| 4,750,771 | * 6/1988 | Emmett et al. | 294/99.2 |
| 4,809,435 | 3/1989 | Printz | 30/142 |
| 4,852,929 | 8/1989 | Shafir | 294/99.2 |
| 4,973,095 | 11/1990 | Kunihisa | 294/99.2 |
| 4,976,718 | 12/1990 | Daniell | 294/99.2 |
| 5,056,173 | 10/1991 | Brincat | 30/142 |
| 5,373,640 | 12/1994 | Cordeiro, Jr. | 30/142 |
| 5,709,423 | * 1/1998 | Romero | 294/99.2 |

FOREIGN PATENT DOCUMENTS

| | | | |
|---|---|---|---|
| 3632-102 | * 4/1987 | (DE) | 294/99.2 |
| 1259920 | * 1/1972 | (GB) | 294/99.2 |

* cited by examiner

*Primary Examiner*—Dean J. Kramer
(74) *Attorney, Agent, or Firm*—Rory Farlan Krieger

(57) ABSTRACT

Abstract: An improved eating utensil. To attain this, the present design provides a utensil base (10) interconnected with both proximal and distal ends. Oriented al the proximal most end of utensil base (10) is a symmetrical counterbalanced handle member (28). Base (10) also includes angled asymmetrical tine members (14A,B) which are oriented along its' distal end. Which further includes interior jaws (17A,B). Wherein, interconnected distal members include elongated tong members (20A,B) horizontal crimping jaws (24A,B) and distal tweezer prong tips (22A,B). Urged manipulation against food morsels occurs along these interconnected distal members and the like.

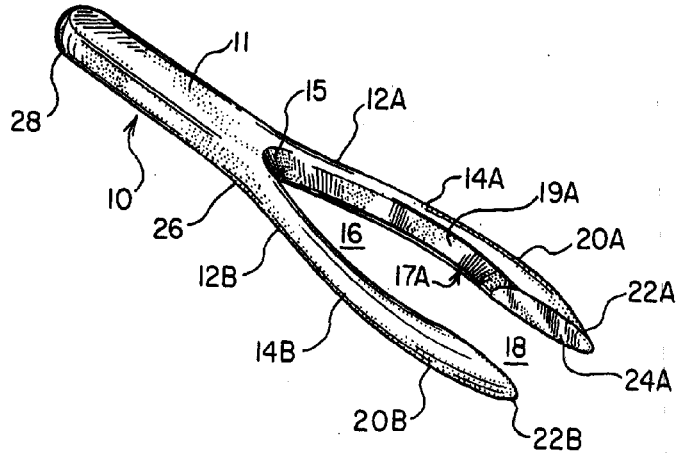

14 Claims, 1 Drawing Sheet